(12) United States Patent
Brankaert et al.

(10) Patent No.: US 11,842,088 B2
(45) Date of Patent: Dec. 12, 2023

(54) METHOD FOR PROCESSING A PRINT JOB BY A PRINTER AND A FINISHER

(71) Applicant: Canon Production Printing Holding B.V., Venlo (NL)

(72) Inventors: Xavier C. M. Brankaert, Venlo (NL); Robertus G. A. Jetten, Venlo (NL); Joris J. M. Baijens, Venlo (NL); Johannes M. Pijnappels, Venlo (NL); Jeroen H. J. De Deken, Venlo (NL); Antonius M. Gerrits, Venlo (NL)

(73) Assignee: CANON PRODUCTION PRINTING HOLDING B. V., Venlo (NL)

( * ) Notice: Subject to any disclaimer, the term of this patent is extended or adjusted under 35 U.S.C. 154(b) by 0 days.

(21) Appl. No.: 18/093,109

(22) Filed: Jan. 4, 2023

(65) Prior Publication Data

US 2023/0221900 A1    Jul. 13, 2023

(30) Foreign Application Priority Data

Jan. 12, 2022  (NL) ..................................... 2030510

(51) Int. Cl.
*G06F 3/12*     (2006.01)
*G06K 15/00*    (2006.01)

(52) U.S. Cl.
CPC .......... *G06F 3/1204* (2013.01); *G06F 3/1253* (2013.01); *G06K 15/4025* (2013.01)

(58) Field of Classification Search
CPC .... G06F 3/1204; G06F 3/1205; G06F 3/1208; G06F 3/1211; G06F 3/1253;
(Continued)

(56) References Cited

U.S. PATENT DOCUMENTS 10,048,916 B1    8/2018  Polackal
2006/0238793 A1*  10/2006  Akashi ................... G06F 3/1204
                                                       358/1.13
(Continued)

FOREIGN PATENT DOCUMENTS

JP    2020-134675 A    8/2020

OTHER PUBLICATIONS

Dutch Search Report, issued in Priority Applciation No. 2030510, dated Nov. 1, 2022.

*Primary Examiner* — Iriana Cruz
(74) *Attorney, Agent, or Firm* — Birch, Stewart, Kolasch & Birch, LLP

(57) ABSTRACT

A method for processing a print job by a printing system and a finishing system resulting in an end product is disclosed. The printing system includes a print controller. The finishing system is an in-line or near-line finishing system and includes a finishing controller for controlling the finishing process by means of a collection of finishing templates stored in memory of the finishing controller. The printing system and the finishing system are connected via a digital connection. The method includes the steps of the print controller receiving the print job including a plurality of print job settings, the print controller establishing an identifier of a finishing template from the collection of finishing templates in accordance with at least one print job setting of the plurality of print job settings, the print controller sending the established identifier of the finishing template to the finishing system, the finishing controller receiving the established identifier of the finishing template, the printing system printing the print job, the finishing system retrieving the finishing template identified by the received identifier from memory of the finishing controller, and the finishing system (Continued)

finishing the print job according to the retrieved finishing template.

11 Claims, 8 Drawing Sheets

(58) Field of Classification Search
CPC .... G06F 3/1255; G06F 3/1275; G06F 3/1264;
G06F 3/1254; G06F 3/1257; G06F
3/1282; G06K 15/4025; G06K 15/403;
G06K 15/404; B41F 13/56; B41F 13/64;
B41F 33/02; B41F 33/16; B41P 2233/10
See application file for complete search history.

(56) References Cited

U.S. PATENT DOCUMENTS

| | | | | |
|---|---|---|---|---|
| 2008/0285082 | A1* | 11/2008 | Morooka | G06F 3/1257 358/1.18 |
| 2020/0267274 | A1* | 8/2020 | Haga | H04N 1/00464 |
| 2021/0132884 | A1* | 5/2021 | Matsuo | G06F 3/1255 |

* cited by examiner

METHOD FOR PROCESSING A PRINT JOB BY A PRINTER AND A FINISHER

FIELD OF THE INVENTION

The present invention relates to a method for processing a print job by a printing system and a finishing system resulting in an end product, the printing system comprising a print controller, the finishing system being an in-line or near-line finishing system and comprising a finishing controller for controlling the finishing process by means of a collection of finishing templates stored in memory of the finishing controller, and the printing system and the finishing system being connected via a digital connection.

The present invention further relates to a printing system and a finishing system configured to execute the method according to the invention.

The finishing system according to the invention is a near-line finisher or an in-line finisher. An off-line or on-line finisher is excluded from the present invention. Hereinafter where a finishing system or a finisher is mentioned, a near-line finisher or an in-line finisher is meant. The printing system and the finishing system may communicate with each other via a digital connection. The digital connection may be a dedicated connection by means of a DFD protocol, or a general connection via a customer network. In principle a network link and protocol over which the communication runs is arbitrarily implementable.

A finishing template is a collection of digital instructions for the finishing system which are loaded into the memory of the finishing controller. The templates may be for example loaded when the finishing actions are started but may also be loaded long before. The finishing system is informed when a new finishing template becomes active so that the instructions are loaded and effectuated on the finisher hardware. For example, part of the instructions may be that paper cutting knives need to be (re)positioned. In general, the digital instructions may determine any combination of finishing actions that the finisher is capable of, e.g. an output size of the end product, a number of cuts, a number of folds, a number of horizontal cuts, a number of vertical cuts, a number of horizontal folds, a number of vertical folds, an XY position of the cuts and the folds, number of staples, position of the staples, etc.

A printing system according to the invention may also be referred to as a printer.

The printing system and the finishing system are devices to print and finish respectively. An input of a device is defined as a resource which is suitable to put in the device for production of a document by the device. The input may for example be a number of loose sheets, a stack of loose sheets, a number of pre-processed sheets, a number of bound sheets like a booklet or a book, one or more cover sheets, a roll of media, etc. The input may be put in an input holder of the device.

An output of a device is defined as a deliverable which is output by the device. The output may for example be a number of loose printed sheets, a stack of loose printed sheets, a number of bound sheets like a booklet or a book, one or more cover sheets, a number of finished sheets like a number of trimmed sheets, a number of cut sheets, a number of perforated sheets, a number of laminated sheets, a number of cut and stacked sheets, or combinations of the here-before mentioned sheets.

BACKGROUND OF THE INVENTION

A printing system is known to receive print job comprising print data, i.e. a customer document, and a plurality of print job settings. A print job setting may be entered or changed at a user interface of the printing system. The customer document typically specifies input size, and an imposition scheme, like 2-up or 4-up, but the printing system may not allow to specify the output size or how the finishing system which is able to process sheets and is able t cut and stack should come to the required end product.

For example, the customer provides an input document with for instance an A3 document size and the customer specifies for instance 2-up or 4-up finishing. However, the finishing system expects to know the input size and the output size, the number of cuts to determine how to cut and stack the sheets, maybe even to perform a rotation of sheets, e.g. when an A3 input size is to result in an A5 size document. Typically finishing system settings are defined in fixed finishing templates.

Usually the finishing system is provided with a user interface at which the operator can specify the desired finishing template. This is rather cumbersome since the operator has to know specific knowledge of the finishing system, i.e. the operator has to know all finishing templates and to deduce which template is to be used for the print job. Before each job change a manual action is needed, which requires the print system and finishing system to be idle leading to productivity loss. If a manual setup is forgotten or a wrong set-up is entered either error or incorrect output may occur.

The printing system and the finishing system are production devices, but a human being like an operator is also capable of participating in a production route for an end product. Nowadays the finisher may be programmed in a separate step by the operator which may lead to errors and additional work. Or, in case no instructions are given for the operator, wrong actions are executed that may lead to waste and reprints.

It is an objective of the present invention to provide a method for processing a print job that needs finishing by the finishing system and to mitigate the operator problems mentioned here-above.

SUMMARY OF THE INVENTION

According to the present invention the objective is achieved by the method according to the invention wherein the method the method comprising the steps of
  the print controller receiving the print job comprising a plurality of print job settings,
  the print controller establishing an identifier of a finishing template from the collection of finishing templates in accordance with at least one print job setting of the plurality of print job settings,
  the print controller sending the established identifier of the finishing template to the finishing system,
  the finishing controller receiving the established identifier of the finishing template,
  the printing system printing the print job,
  the finishing system retrieving the finishing template identified by the received identifier from memory of the finishing controller,
  the finishing system preparing a state of the finishing system according to the retrieved finishing template, and
  the finishing system finishing the print job according to the retrieved finishing template.

According to an embodiment the established identifier of the finishing template is an alphanumeric code number. Examples of alphanumeric code numbers are "12", "12A", "A5", "AB901", "A008B", "FT1", etc. In a preferred embodiment the alphanumeric code number is a one-liner. For example, the alphanumeric code number fits into one line in an entry box of a user interface window of a user interface of the printing system.

According to an embodiment the at least one print job setting of the plurality of print job settings is a single one print job setting.

According to an embodiment the printing system comprises a user interface and the method comprises the steps of the user interface receiving the identifier of the finishing template and attributing the received identifier to the single one print job setting before the step of the print controller establishing the single one print job setting. The operator may have to use only the user interface of the printing system and does not have to use the user interface of the finishing system anymore for entering the finishing template identifier.

According to an embodiment the step of the print controller establishing the identifier of the finishing template comprises the steps of deriving customer document requirements from the plurality of print job settings, and based on the customer document requirements automatically selecting a best matching finishing template from the collection of finishing templates in order to achieve the end product. The finishing template contains detailed information on the action that will be done by the finishing template. The print controller can do a match between the received print job settings and the actions within a finishing template to select (the identifier of) the best matching template.

According to an embodiment the method comprises the step of minimizing a time period between the step of the print controller establishing the identifier of the finishing template and the step of the print controller sending the established identifier of the finishing template to the finishing system. By minimizing said time period an automatic setup of the finishing system according to the received finishing template may be started as early as possible.

According to an embodiment the step of the print controller sending the established identifier of the finishing template to the finishing system is in time before or simultaneously with the start of printing the print job by the printing system. This is advantageous, since the time period which is needed to print the print job can be used to automatically set up—at least partially—the finishing system according to the received finishing template during printing of the print job.

According to an alternative embodiment the method comprises the step of the print controller receiving at least part of the collection of finishing templates from the finisher controller via the digital connection.

According to an embodiment the steps of the printing system printing the print job and the finishing system finishing the print job are intermingled per set of at least one sheet for the print job being processed.

The present invention is also related to a printing system for printing a print job in order to deliver a printed end product, the printing system comprising a print controller, wherein the print controller is configured to receive the print job comprising a plurality of print job settings, to establish an identifier of a finishing template from a collection of finishing templates defined for a finishing system intended to be used after printing the print job by the printing system, in accordance with at least one print job setting of the plurality of print job settings, to determine an identifier of the established finishing template, to submit the identifier of the established finishing template to the finishing system via a digital connection, and to print the print job.

According to an embodiment the print controller is configured to derive customer document requirements from the plurality of print job settings and based on the customer document requirements to automatically select a best matching finishing template from the collection of finishing templates in order to achieve a finished end product according to the customer document requirements.

The present invention also relates to a finishing system for finishing a printed end product produced by a printing system in order to deliver a finished end product, the finishing system being an in-line or near-line finishing system and comprising a finishing controller and a memory comprising a collection of finishing templates and the finishing system connected via a digital connection with the printing system, wherein the finishing controller is configured to receive an identifier of a finishing template out of the collection of finishing templates from the printing system via a digital connection, to retrieve the finishing template identified by the received identifier from memory of the finishing controller, to prepare a state of the finishing system according to the retrieved finishing template and the finishing system is configured to finish the printed end product according to the retrieved finishing template.

The present invention also relates to a non-transitory software medium comprising executable program code configured to, when executed on a computer, enable the computer to perform the steps of the method according to the present invention.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

FIG. 4 shows a user interface window of the printing system according to an embodiment of the present invention.

FIG. 5 shows a user interface window of the printing system according to another embodiment of the present invention.

FIG. 6-7 show the user interface window of FIG. 5 with different print job settings.

DETAILED DESCRIPTION OF THE EMBODIMENTS

Figure 1:
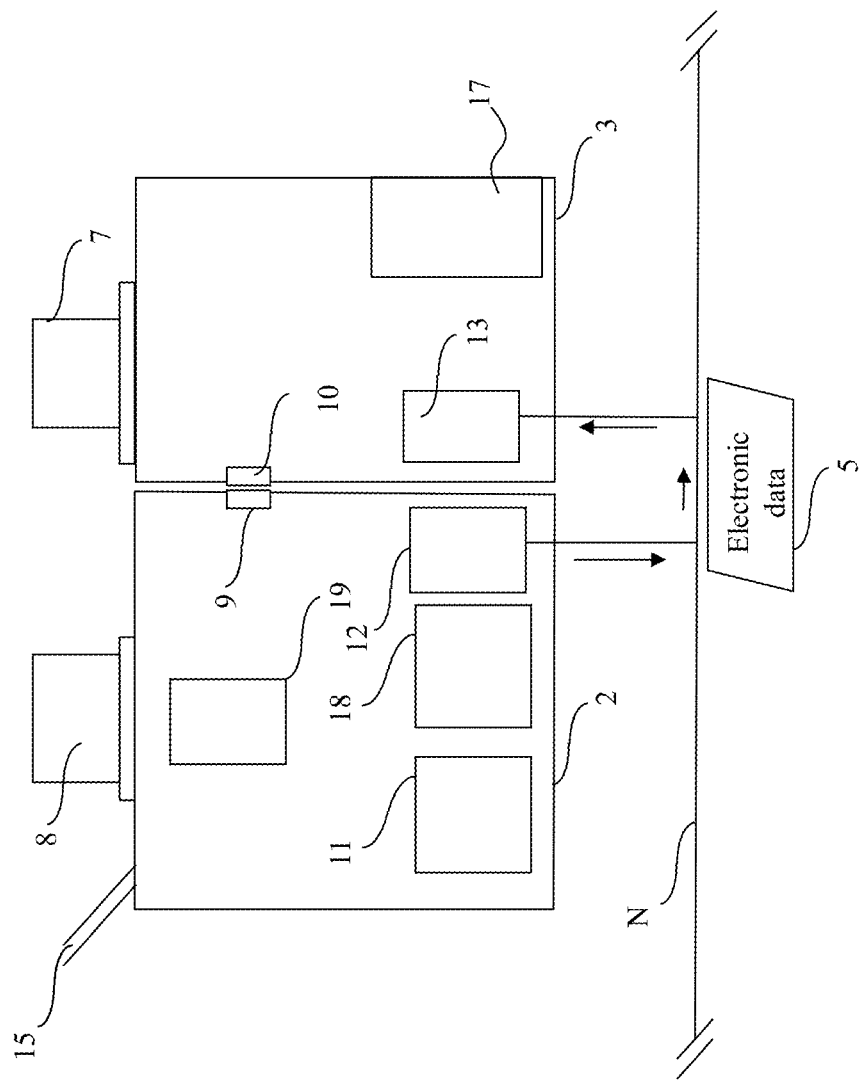
FIG. 1 shows a schematic view of a printing system according to the present invention and a finishing system according to the present invention.

The present invention will now be described with reference to the accompanying drawings, wherein the same or similar elements are identified with the same reference numerals throughout the several views.

The following table introduces device definitions for in-line finishers, on-line finishers, off-line finishers and near-line finishers.

| integrated into the printing production route? | Settings Flow | |
|---|---|---|
| | YES | NO |
| Paper flow  YES | IN-line | ON-line |
| NO | NEAR-line | OFF-line |

An in-line device or an on-line device is part of the printing device. An off-line device or a near-line device is not part of the printing device. An in-line device and a near-line device are subject of the present invention. The finishing system 3 in FIG. 1 is an example of an in-line finisher.

The present invention is suitable for an in-line finishing system and a near-line finishing system. FIG. 1 is a schematic view of a printing system 2 and an in-line finishing system 3. The printing system 2 comprises a printer user interface 8, a sheet outlet 9 for outputting printed sheets to the in-line finishing system 3, a print controller 12, an optional automatic document feeder 15 for feeding sheets of print media to the printing system 2, at least one input holder 11, 18 for holding a stack of sheets to be printed upon. The printer user interface 8 serves as a graphical output device but may also be configured as a touch-sensitive screen, so that it can serve as an input/output device for entering commands and for displaying messages to be output to a user. In another embodiment, a separate input device may be provided, e.g. in the form of a keyboard and a mouse. The in-line finishing system 3 comprises a finishing user interface 7, a sheet inlet 10 for receiving printed sheets from the printing system 2, a finisher controller 13, an output holder 17 for receiving and holding output of a plurality of sheets, for example a stack of printed and finished sheets. In the illustration of FIG. 1 an in-line finisher is shown, but a near-line finisher is also an option according to the present invention. The printing system 2 is connected to the finishing system 3 by means of an electronic connection via a common network N order to send electronic data 5. However a dedicated connection for sending electronic data 5 outside of the common network may be envisioned. The connection shown in FIG. 1 is enabling one-directional data transfer, but bi-directional data transfer may be also envisioned.

Figure 2:
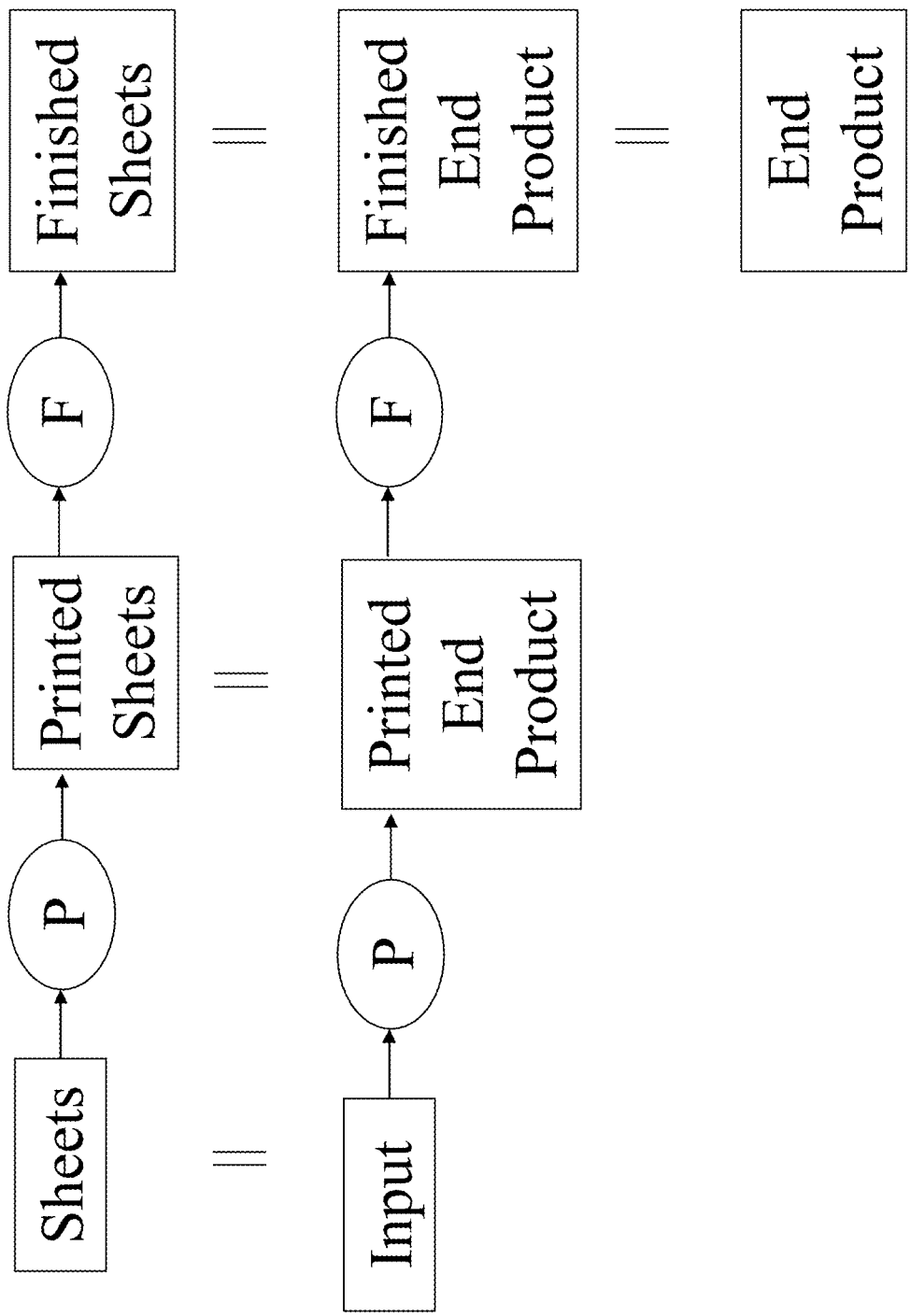
FIG. 2 shows a schematic view of a workflow for the printing system and the finishing system according to the present invention.

FIG. 2 shows a schematic view of a workflow for the printing system and the finishing stem according to the present invention. Sheets are input for the printer P which delivers printed sheets as a printed end product. The printed sheets are input for the finisher F which delivers finished sheets as a finished end product. The finished end product is also the final end product of the workflow of the printer P and finisher F. According to another embodiment the printer P and the finisher F are processing the print job sheet by sheet, i.e. the sheets are is processed by the printer P and the finisher F one-by-one.

Figure 3:
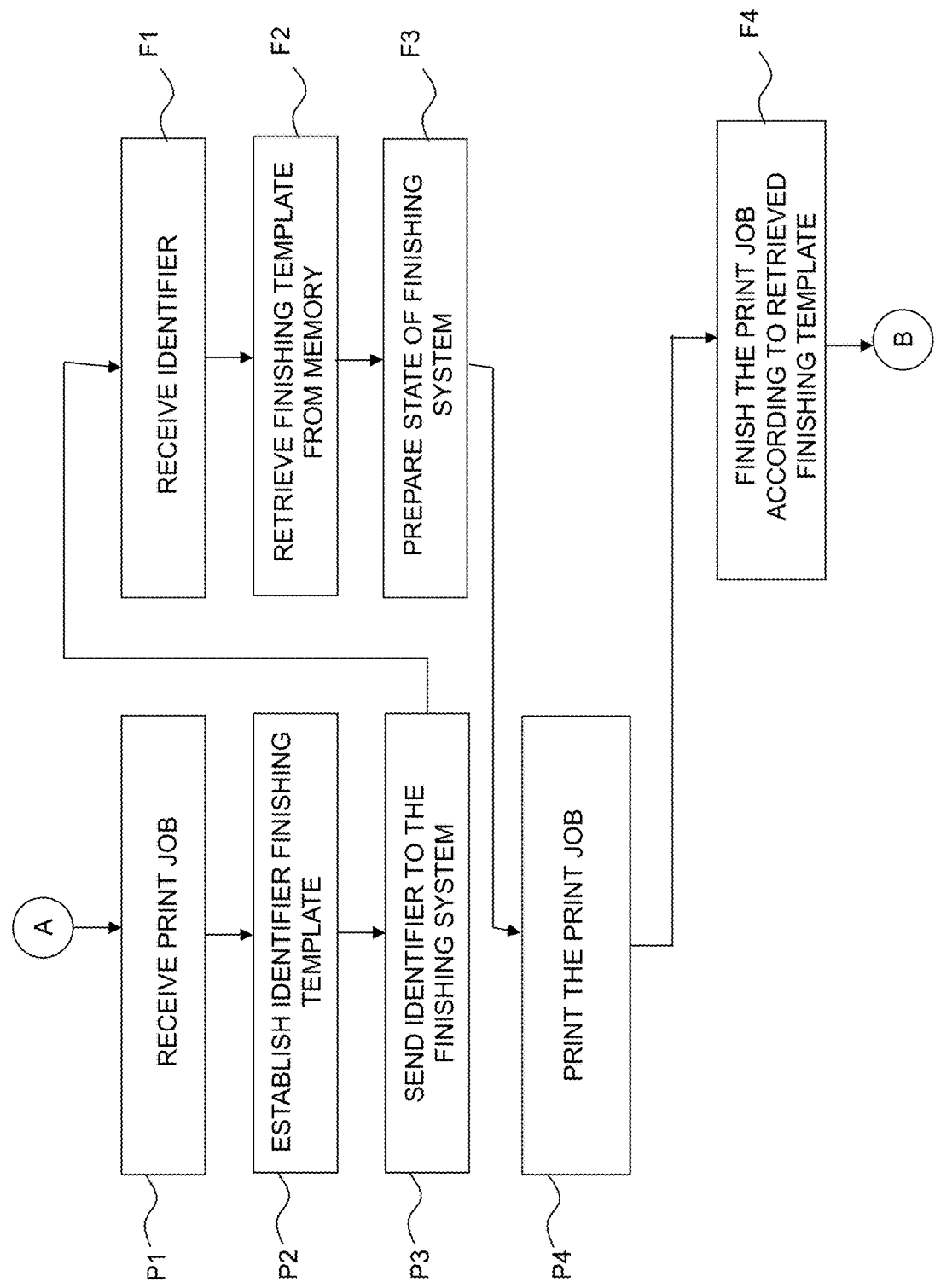
FIG. 3 is a flow diagram of an embodiment of method according to the present invention.

FIG. 3 is a flow diagram of an embodiment of the method according to the present invention. The flow diagram contains a number of steps P1-P4, F1-F4. The steps P1 -P4 are performed by the printing system. The steps F1-F4 are performed by the finishing system. The sequence orders of the steps may vary in the following ways each of which falls under the scope of protection of the present invention: (P1,P2,P3,F1,F2,P4,F3,F4), (P1,P2,P3,P4,F1,F2,F3,F4), (P1,P2,P3,F1,P4,F2,F3,F4), (P1,P2,P3,F1,F2,P4,F3,F4), (P1,P2,P4,P3,F1,F2,F3,F4), (P1,P4,P2,P3,F1,F2,F3,F4), (P1,P2,P4,P3,F1,F2,F3,F4) and (P1,P2,P3,F1,F2,F3,P4,F4).

The sequence order (P1,P2,P3,F1,F2,F3,P4,F4) is preferable wherein an actual configuration of the finishing system is occurring in between the steps F2 and P4.

According to another embodiment the step of start printing P4 is occurring during the finishing steps F1 and F2. This is advantageous with respect to a performance of the combination of the printing system and the finishing system.

The method starts in a start point A which leads to a first step P1.

In the first step P1 the print controller receives the print job comprising a plurality of print job settings.

In a second step P2 the print controller establishes an identifier of a finishing template from the collection of finishing templates in accordance with at least one print job setting of the plurality of print job settings.

In a third step P3 the print controller sends the established identifier of the finishing template to the finishing system.

In a fourth step F1 the finishing controller receives the established identifier of the finishing template.

In a fifth step F2 the finishing system retrieves the finishing template identified by the received identifier from memory of the finishing controller.

In a sixth step F3 the finishing system prepares its state according to the retrieved finishing template.

In a seventh step P4 the printing system prints the print job.

In an eighth step F4 the finishing system finishes the print job according to the retrieved finishing template.

The method ends in an end point B.

The flow diagram of FIG. 3 is just exemplary for the case that the finishing system does the finishing steps after the printing of the complete print job. However, other combinations of printing and finishing steps may be envisioned. For example, one sheet after another sheet may be printed and finished according to the selected template. Such a combination of printing and finishing steps may depend on the finishing system type, i.e. a sheet orientated finishing system versus a document orientated finishing system. Thereto the printing step P4 and the finishing step F4 may be intermingled per set of at least one sheet for the print job being processed. For example, the printing step P4 and the finishing step F4 may be alternated.

Figure 4:
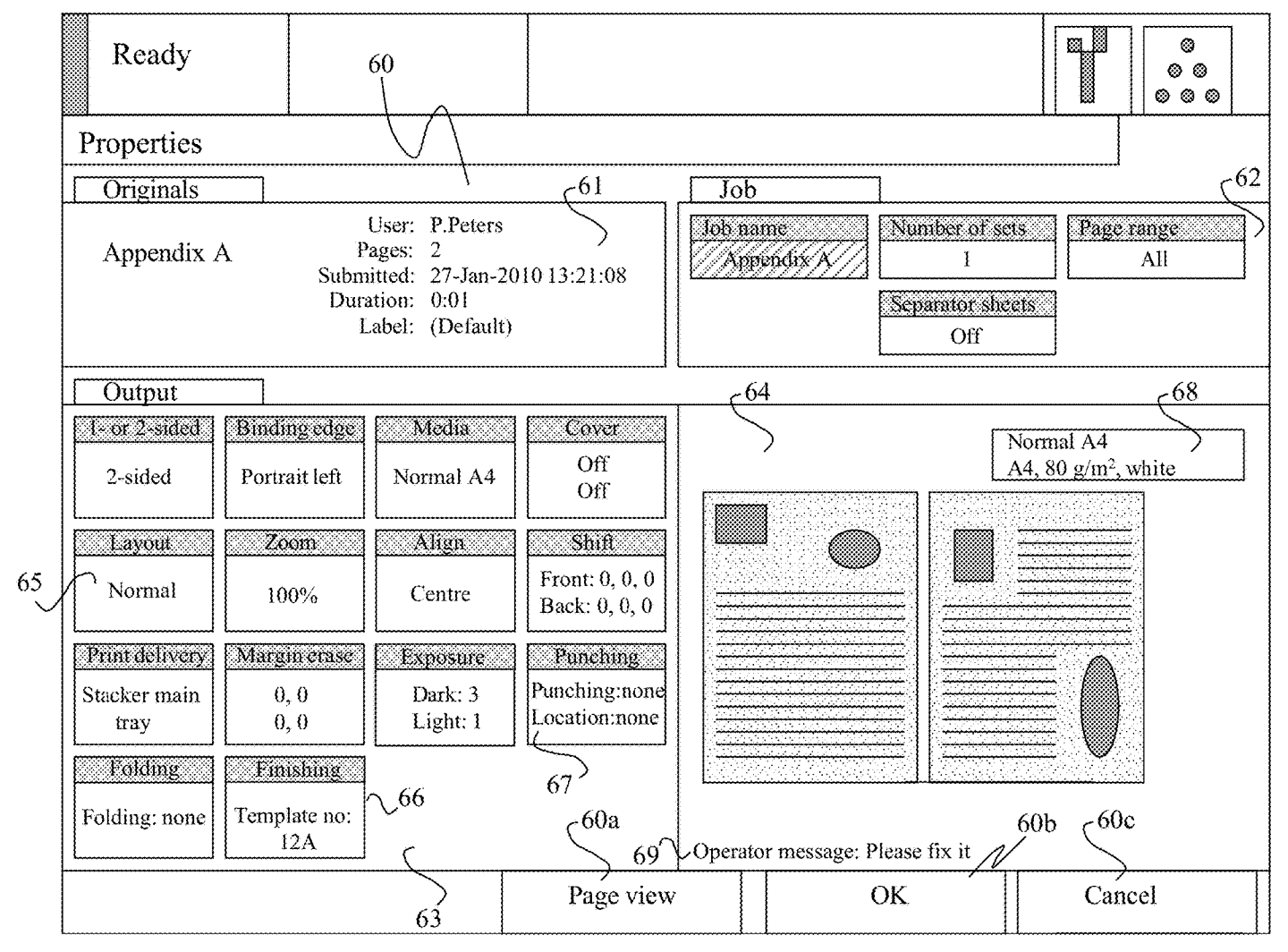

FIG. 4 shows a first embodiment of the invention wherein the at least one print job setting of the plurality of print job settings of the received print job is a single one print job setting.

A user interface of the printing system may comprise a first user interface window (not shown) for selecting the received print job. FIG. 4 shows a second user interface window 60 of the printing system which is displayed when the received print job is selected in the first user interface window. The user interface window 60 comprises a set of properties of the selected print job.

Data belonging to the original data file enclosed in the print job is shown in a first area 61, for example a file name, a user name, a number of pages of the data file, a submission date and time, an estimated duration and a file label.

Job related data is shown in a second area 62, for example a job name, a number of sets, a page range and the possibility for using separator sheets.

Settings of the output are shown in a third area 63, for example 1-sided or 2-sided, binding edge, media, cover, layout, zoom factor, alignment, shift parameters, print delivery, margin erase, exposure, punching and folding. A setting in the third area 63 may be changed by the operator. For example, a layout setting 65 may be changed, a punch setting 67 may be changed, etc. According to the first embodiment one of the settings in the third area 63 is the print job setting 66 which can be used to identify the finishing template which is intended to be used by the finishing system when finishing the printed print job.

In a first case a value of the print job setting 66 may be part of values of the plurality of print job settings which have been determined for the print job before the print job is received by the printing system, for example during job submission by means of a job submission tool or during invoking a printer driver for the printing system. Then the value for the print job setting 66 is already present and visible in the user interface window 60 at the moment that the user interface window 60 is opened for the received print job.

In a second case a value for the print job setting 66 is not part of the values of the plurality of print job settings which have been determined for the print job before the print is received by the printing system, but the value for the print job setting 66 is received by means of entering a value for the print job setting 66 in the user interface window 60 by a user or operator. A default value may be present. In an alternative embodiment processing is stopped and input for the print job setting 66 is requested via the user interface window 60 (not shown), for example by means of an additional pop-up window. When an OK button 60*b* is activated by the user or operator, the value of the print job setting 66 which is the identifier of the finishing template which is going to be used by the finishing system is attributed to the single one print job setting 66 and sent to the print controller of the printing system.

When the value of the print job setting 66 is conflicting with other settings which determine at least a part of a finishing option, the operator gets a warning in an operator message 69. According to an alternative embodiment the print job setting 66 is leading, i.e. the value of the print job setting 66 overrules other settings which conflict with the print job setting 66. In a further embodiment conflict handling is implemented for the print job setting 66. The input process is stopped until the contradiction is resolved.

A schematic preview of a printed data file is shown in a fourth area 64. Media specifications 68 and an operator message 69 may also be shown in the fourth area 64.

A bottom toolbar may show a page view button item 60*a* in order for viewing each individual page of the data file, the OK button item 60*b* in order to confirm changed settings and a cancel button item 60*c* in order to cancel the changes done on the fourth window 60.

A change of the finishing template identifier in the print job setting 66 is confirmed by the printing system as soon as the OK button item 60*b* is activated. By activation of the OK button the print job setting 66 and the other print job settings are transmitted to the print controller. The print controller will send the identifier, which is "12A" in FIG. 4, to the finishing system at an appropriate moment in time.

FIGS. 5-8 show a second embodiment of the invention wherein the step of the print controller establishing the identifier of the finishing template comprises the steps deriving customer document requirements from the plurality of print job settings, and based on the customer document requirements automatically selecting a best matching finishing template from the collection of finishing templates in order to achieve the end product.

Figure 5:
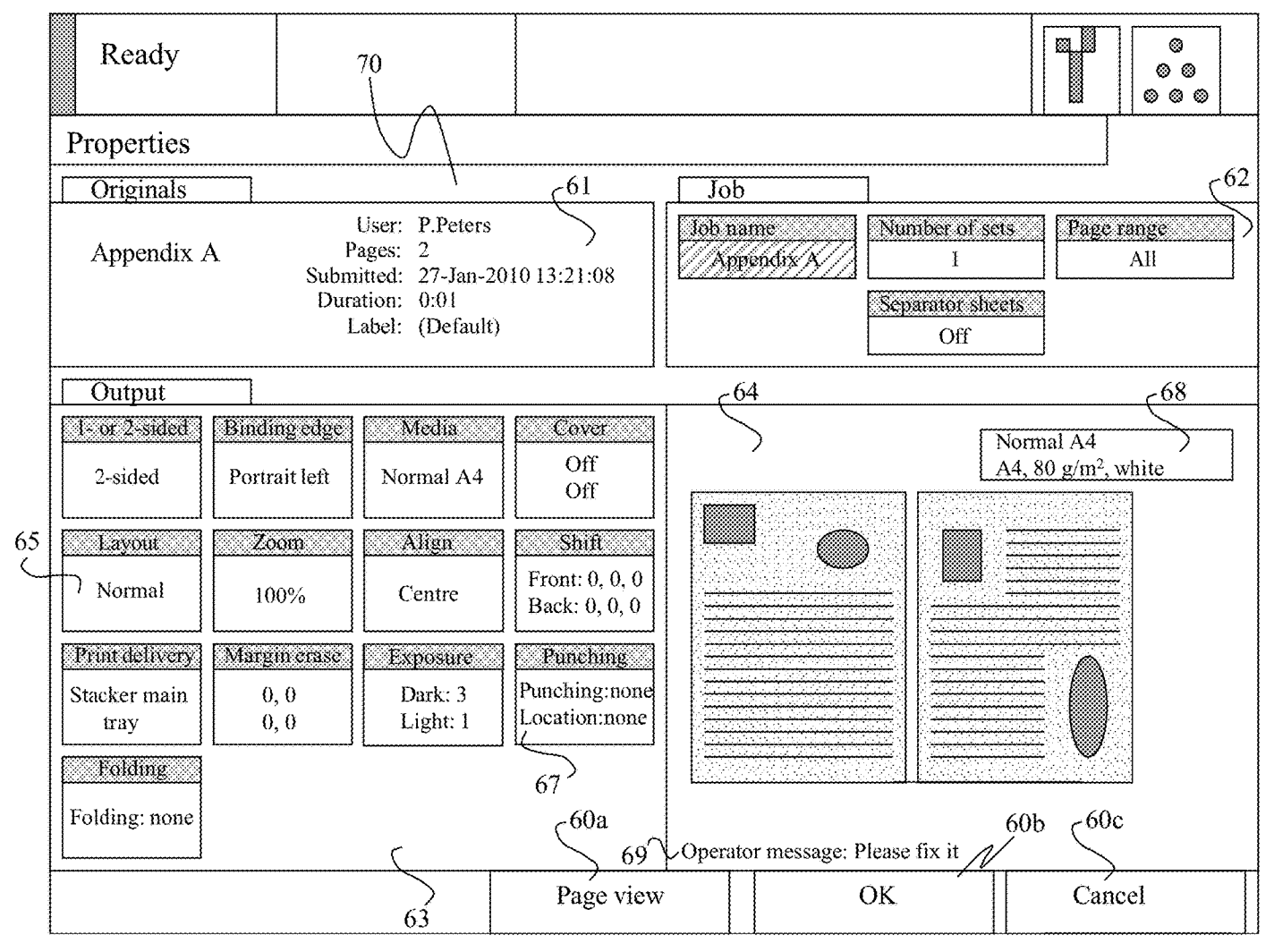

FIG. 5 shows a user interface window 70 of the printing system. The window 70 comprises a set of properties of the received print job which equals the set of properties of the received print job in FIG. 4, except that the print job setting 66 which identifies the finishing template is left out.

From the settings in the first area 61, the second area 62, the third area 63 including a layout setting 65, and the media specifications 68, the print controller is deriving customer document requirements. Based on the customer document requirements the print controller automatically selects a best matching finishing template from the collection of finishing templates in order to achieve the end product. The automatic selection by the print controller may be realized by a rule-based system, a decision tree, look-up tables, etc. The rule-base system may be an extension of a rule-based system in the printing system context which is already present in the print controller of the printing system.

Figure 6:
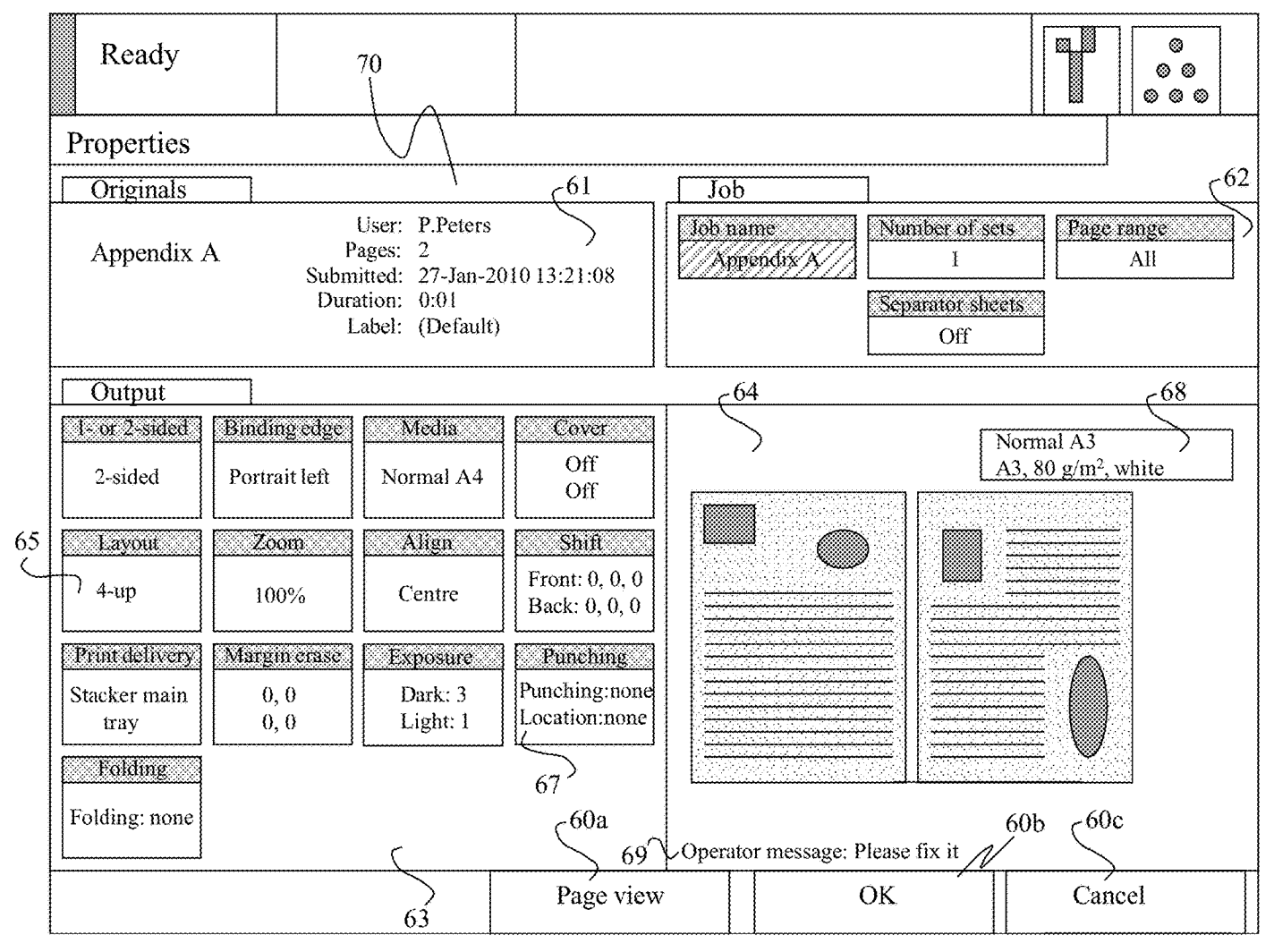
Figure 7:
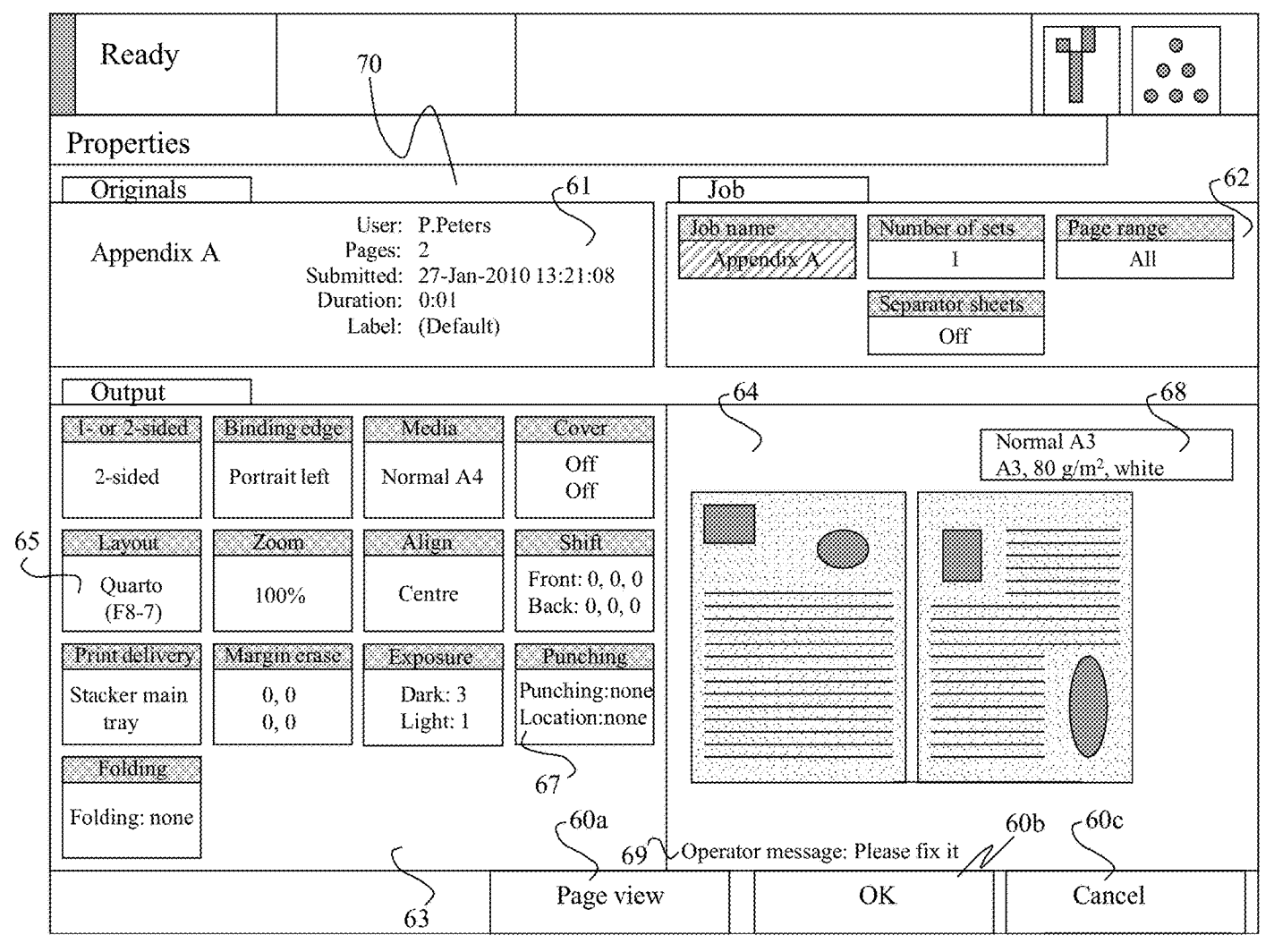
Figure 8:
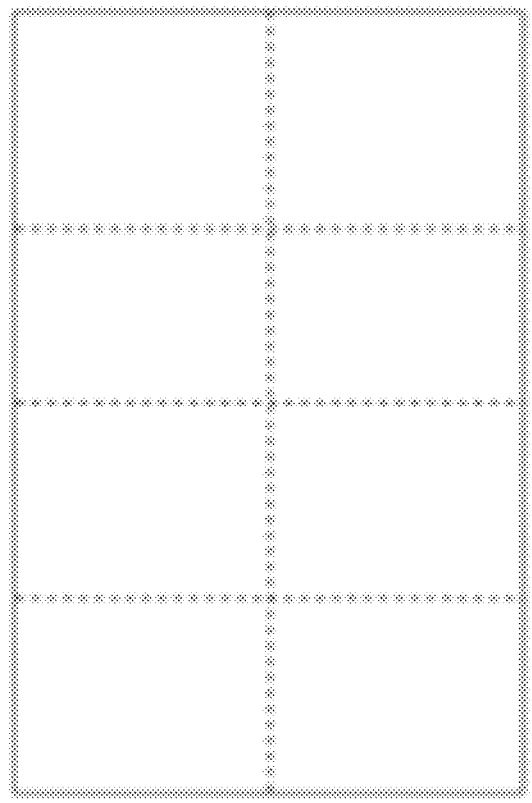
FIG. 8 shows an imposition scheme for a finishing template according to the present invention.

FIG. 6-8 show examples how to select a finishing template based on the print job settings. The OK button 60*b* saves settings when changed.

FIG. 6 shows a first example wherein the layout setting 65 and the media specifications 68 match best with a finishing template. For example, when the layout setting 65 is changed into "4-up" and the media size is changed into "A3", a finishing template identifier no X is selected as the identifier of the best matching finishing template. When the finishing controller receives the finishing template identifier no X via the digital connection between the printing system and the finishing system, the finishing controller uses his internal determination of the finishing settings by means of the finishing template identifier no X. In case of the first example, the finishing template identified by no X results in a page size width of 297 mm and a page height of 420 mm, a finish size width of 148.5 mm, a finish size height of 210 mm, 2 crosses, 2 vertical groups and a digital set of finishing instructions comprising an instruction to a first knife in the finishing system of "DOUBLE CUT".

The first example refers to a 4-up layout meaning that there is a requirement of 4 pages on one sheet, 2×2. The requirement defines that a double cut—normal and cross—is needed in order to make 4 separate pages. Thus in the first example there is no double cut of one knife but two knives or slit wheels are involved that each do one cut, i.e. the instruction involves a roll knife cutting the paper in a feed direction of the recording medium and one knife cutting cross-feed.

FIG. 7 shows a second example wherein the layout setting 65 is changed into the imposition template "Quarto F8-7", a finishing template identifier no Y is best matching. When the finishing controller receives the finishing template identifier no Y via the digital connection between the printing system and the finishing system, the finishing controller uses his internal determination of the finishing settings by means of the finishing template identifier no Y. In case of the second example, the finishing template identified by no Y results in a digital set of finishing instructions for a multiple cross cut and a central slit according to the imposition template "Quarto F8-7" which is known to the finishing controller and shown in FIG. 8.

The skilled person will recognise that other embodiments are possible within the scope of the appended claims.

The invention claimed is:

1. A method for processing a print job by a printing system and a finishing system resulting in an end product, the printing system comprising a print controller, the finishing system being an in-line or near-line finishing system and comprising a finishing controller for controlling the finishing process by means of a collection of finishing templates stored in memory of the finishing controller, and the printing system and the finishing system being connected via a digital connection, the method comprising the steps of
- the print controller receiving the print job comprising a plurality of print job settings;
- the print controller establishing, via a single user interface of the print controller, an identifier of a finishing template from the collection of finishing templates in accordance with at least one print job setting of the plurality of print job settings;
- the print controller sending the established identifier of the finishing template to the finishing system;
- the finishing controller receiving the established identifier of the finishing template;
- the printing system printing the print job;
- the finishing system retrieving the finishing template identified by the received identifier from the memory of the finishing controller;
- the finishing system preparing a state of the finishing system according to the retrieved finishing template; and
- the finishing system finishing the print job according to the retrieved finishing template.

2. The method according to claim 1, wherein the established identifier of the finishing template is an alphanumeric code number.

3. The method according to claim 1, wherein the at least one print job setting of the plurality of print job settings is a single one print job setting.

4. The method according to claim 3, wherein the printing system comprises a user interface and the method comprises the steps of the user interface receiving the identifier of the finishing template and attributing the received identifier to the single one print job setting before the step of the print controller establishing the single one print job setting.

5. The method according to claim 1, wherein the step of the print controller establishing the identifier of the finishing template comprises the steps of deriving customer document requirements from the plurality of print job settings, and based on the customer document requirements automatically selecting a best matching finishing template from the collection of finishing templates in order to achieve the end product.

6. The method according to claim 1, wherein the steps of the printing system printing the print job and the finishing system finishing the print job are intermingled per set of at least one sheet for the print job being processed.

7. A non-transitory software medium comprising executable program code configured to, when executed on a computer, enable the computer to perform the steps of the method according to claim 1.

8. A method according to claim 1, wherein the identifier of the finisher template is one of the print job settings of the plurality of print job settings.

9. A printing system for printing a print job in order to deliver a printed end product, the printing system comprising a print controller, wherein the print controller is configured to receive the print job comprising a plurality of print job settings, to establish, via a single user interface of the print controller, an identifier of a finishing template from a collection of finishing templates defined for a finishing system intended to be used after printing the print job by the printing system, in accordance with at least one print job setting of the plurality of print job settings, to determine an identifier of the established finishing template, to submit the identifier of the established finishing template to the finishing system via a digital connection, and to print the print job.

10. The printing system according to claim 9, wherein the print controller is configured to derive customer document requirements from the plurality of print job settings and based on the customer document requirements to automatically select a best matching finishing template from the collection of finishing templates in order to achieve a finished end product according to the customer document requirements.

11. A finishing system for finishing a printed end product produced by a printing system in order to deliver a finished end product, the finishing system being an in-line or near-line finishing system and comprising a finishing controller and a memory comprising a collection of finishing templates and the finishing system connected via a digital connection with the printing system, wherein the finishing controller is configured to receive an identifier of a finishing template out of the collection of finishing templates from a single user interface of a print controller of the printing system via a digital connection, to retrieve the finishing template identified by the received identifier from memory of the finishing controller, to prepare a state of the finishing system according to the retrieved finishing template and the finishing system is configured to finish the printed end product according to the retrieved finishing template.

* * * * *